(12) United States Patent
O'Malley et al.

(10) Patent No.: US 10,530,002 B2
(45) Date of Patent: Jan. 7, 2020

(54) ION-CONDUCTING MEMBRANE

(71) Applicant: JOHNSON MATTHEY FUEL CELLS LIMITED, London (GB)

(72) Inventors: Rachel Louise O'Malley, High Wycombe (GB); Nadia Michele Permogorov, Didcot (GB); Michael Ian Petch, Berkshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 1013 days.

(21) Appl. No.: 14/350,162

(22) PCT Filed: Oct. 24, 2012

(86) PCT No.: PCT/GB2012/052636
§ 371 (c)(1),
(2) Date: Apr. 7, 2014

(87) PCT Pub. No.: WO2013/061054
PCT Pub. Date: May 2, 2013

(65) Prior Publication Data
US 2014/0315117 A1   Oct. 23, 2014

(30) Foreign Application Priority Data
Oct. 24, 2011 (GB) .................... 1118288.8

(51) Int. Cl.
*H01M 8/10* (2016.01)
*H01M 8/1032* (2016.01)
(Continued)

(52) U.S. Cl.
CPC ....... *H01M 8/1032* (2013.01); *H01M 4/9041* (2013.01); *H01M 4/92* (2013.01);
(Continued)

(58) Field of Classification Search
CPC ............. H01M 8/1032; H01M 8/1053; H01M 8/1044; H01M 8/1041; H01M 2300/0094
See application file for complete search history.

(56) References Cited

U.S. PATENT DOCUMENTS 6,110,330 A    8/2000  Lin et al.
6,254,978 B1   7/2001  Bahar et al.
(Continued)

FOREIGN PATENT DOCUMENTS

CN    1881667         12/2006
CN    1881667 A   *   12/2006
(Continued)

OTHER PUBLICATIONS

International Search Report, dated Mar. 4, 2013, from corresponding PCT application.
(Continued)

*Primary Examiner* — Stephan J Essex
(74) *Attorney, Agent, or Firm* — BakerHostetler

(57) ABSTRACT

An ion-conducting membrane including a first layer and a second layer, wherein the first layer includes a perfluorosulphonic acid polymer and the second layer includes a sulphonated hydrocarbon polymer, characterised in that the ion-conducting membrane has a total thickness of from 5 μm to 50 μm and the second layer has a total thickness of 2 μm or less is disclosed.

20 Claims, 4 Drawing Sheets

(51) Int. Cl.
| | |
|---|---|
| H01M 8/1027 | (2016.01) |
| H01M 4/90 | (2006.01) |
| H01M 8/1041 | (2016.01) |
| H01M 8/1053 | (2016.01) |
| H01M 4/92 | (2006.01) |
| H01M 8/1025 | (2016.01) |
| H01M 8/1023 | (2016.01) |
| H01M 8/1044 | (2016.01) |
| H01M 8/1004 | (2016.01) |
| H01M 8/1039 | (2016.01) |

(52) U.S. Cl.
CPC ....... *H01M 8/1004* (2013.01); *H01M 8/1023* (2013.01); *H01M 8/1025* (2013.01); *H01M 8/1027* (2013.01); *H01M 8/1039* (2013.01); *H01M 8/1044* (2013.01); *H01M 8/1053* (2013.01); *H01M 8/1055* (2013.01); *H01M 2300/0082* (2013.01); *H01M 2300/0091* (2013.01); *H01M 2300/0094* (2013.01)

(56) References Cited

U.S. PATENT DOCUMENTS

| | | | | |
|---|---|---|---|---|
| 2004/0036394 | A1* | 2/2004 | Hamrock | B01D 69/12 313/30 |
| 2005/0095486 | A1* | 5/2005 | Hamamoto | B01D 69/12 429/483 |
| 2006/0065521 | A1 | 3/2006 | Liu et al. | |
| 2006/0065522 | A1 | 3/2006 | Liu et al. | |
| 2006/0159973 | A1* | 7/2006 | Kotera | C08J 5/2281 521/27 |
| 2006/0269655 | A1 | 11/2006 | Higami et al. | |
| 2007/0128489 | A1 | 6/2007 | Koyama et al. | |
| 2010/0323277 | A1 | 12/2010 | Roberts | |
| 2014/0349213 | A1* | 11/2014 | Pintauro | H01M 8/1044 429/492 |

FOREIGN PATENT DOCUMENTS

| | | |
|---|---|---|
| CN | 1881667 A | 12/2006 |
| CN | 101034750 | 9/2007 |
| CN | 101383404 | 3/2009 |
| DE | 102004063215 A1 | 2/2007 |
| EP | 0 814 897 B1 | 1/1998 |
| EP | 1359634 A2 | 4/2003 |
| EP | 1 359 634 A2 | 11/2003 |
| EP | 2 190 047 A1 | 5/2010 |
| EP | 2190047 A1 | 5/2010 |
| JP | 2006-522446 A | 9/2006 |
| JP | 2007-157425 A | 6/2007 |
| KR | 20100134579 A | 12/2010 |
| WO | 2005/020356 A1 | 3/2005 |

OTHER PUBLICATIONS

GB Search Report, dated Nov. 28, 2011, from corresponding GB application.

CN Office Action, dated Nov. 27, 2015; Application No. 201280052490.9.

Yang, B. et al., "Multilayered Membranes with Suppressed Fuel Crossover for Direct Methanol Fuel Cells," Electrochemistry Communications, 6, 2004, pp. 231-236.

Ren, S. et al., "Surface Modification of Sulfonated Poly(Ether Ether Ketone) Membranes Using Nafion Solution for Direct Methanol Fuel Cells," Journal of Membrane Science, 247, 2005, pp. 59-63.

Chinese Office Action issued in Application No. 201280052490.9, dated Mar. 22, 2017.

Japanese Office Action, dated Jun. 14, 2016; in corresponding Application No. 2014-536338, English translation provided.

* cited by examiner

Figure 1
Figure 1a
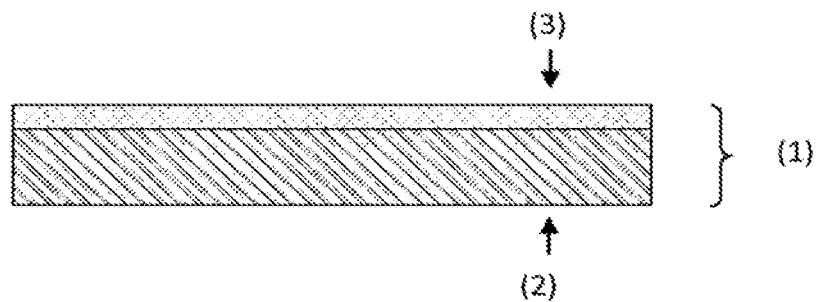
Figure 1b
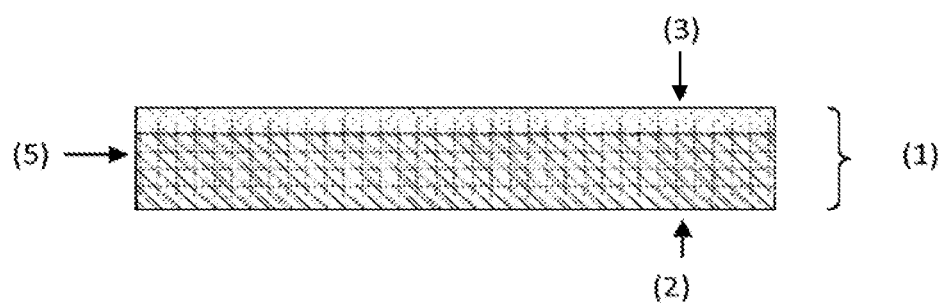
Figure 1c
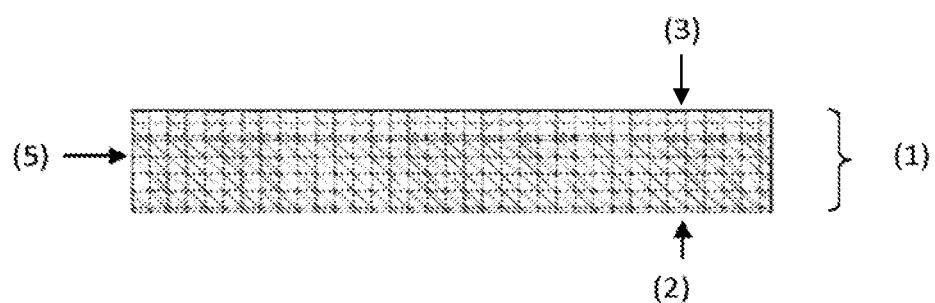

Figure 2
Figure 2a
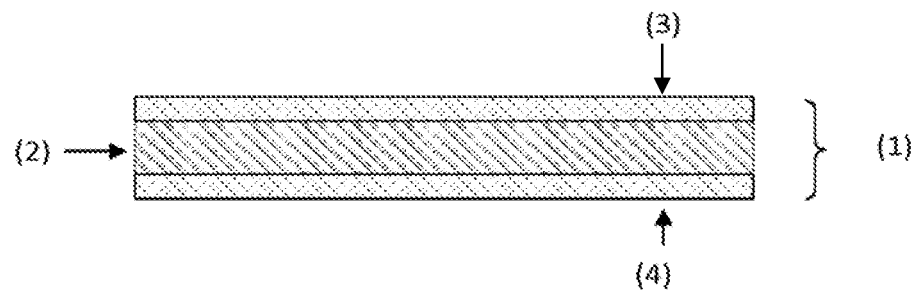
Figure 2b
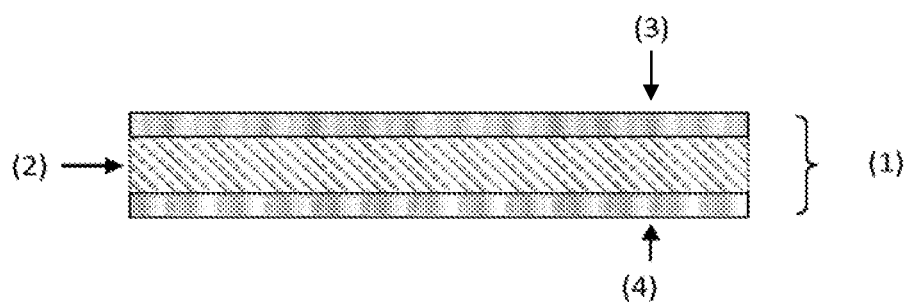
Figure 2c
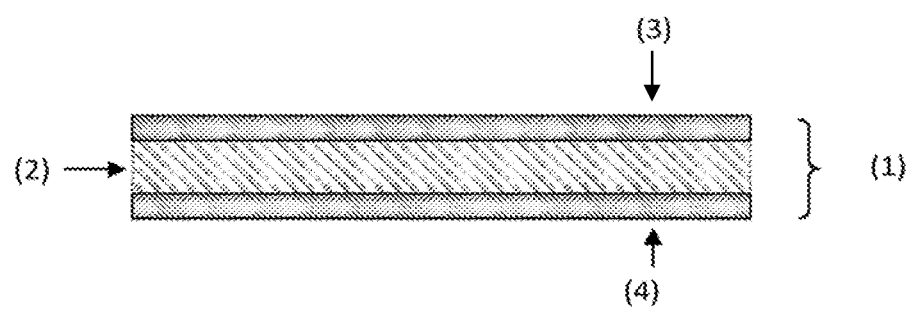

Figure 3: Single Cell Performance Data
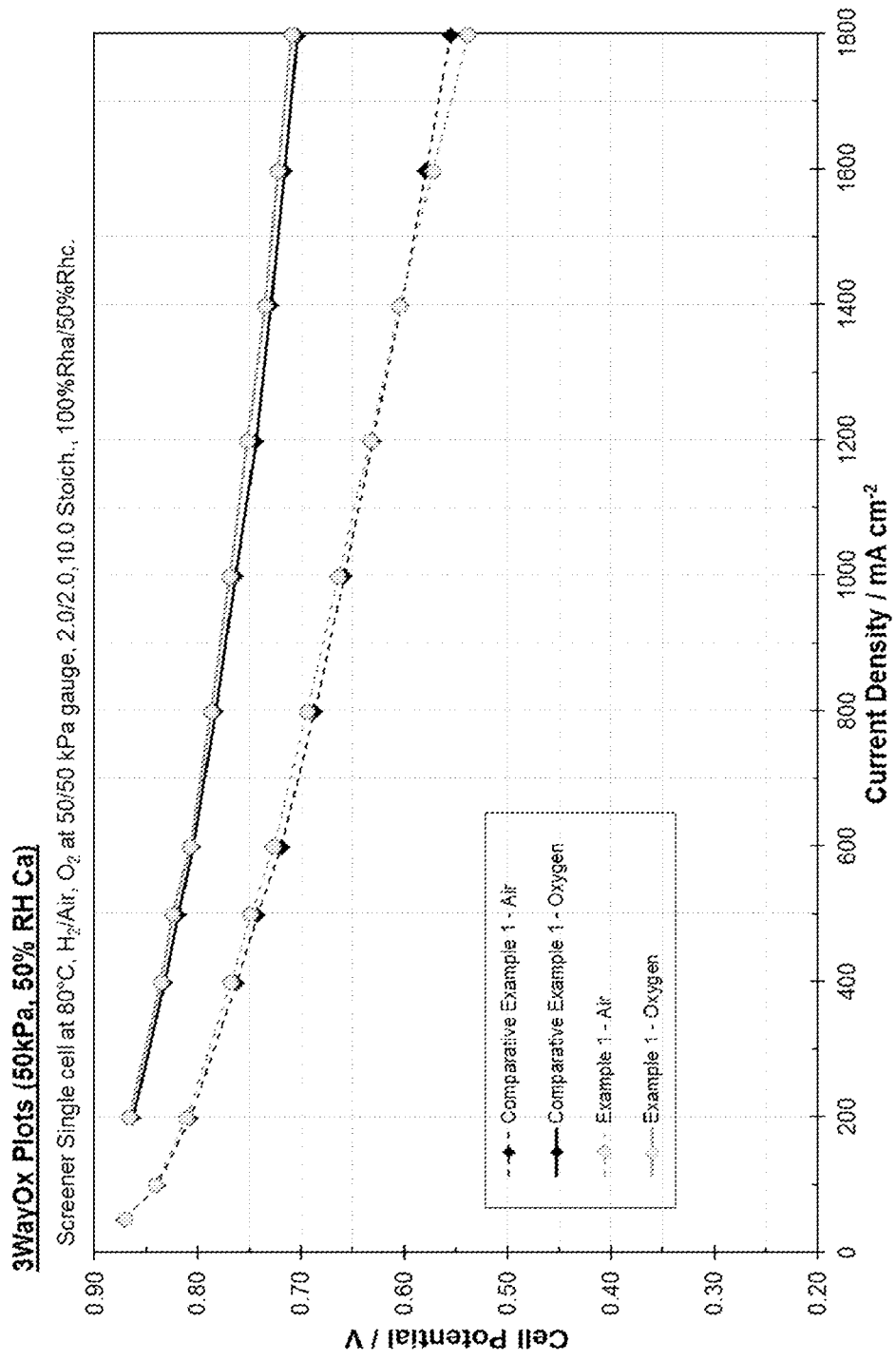

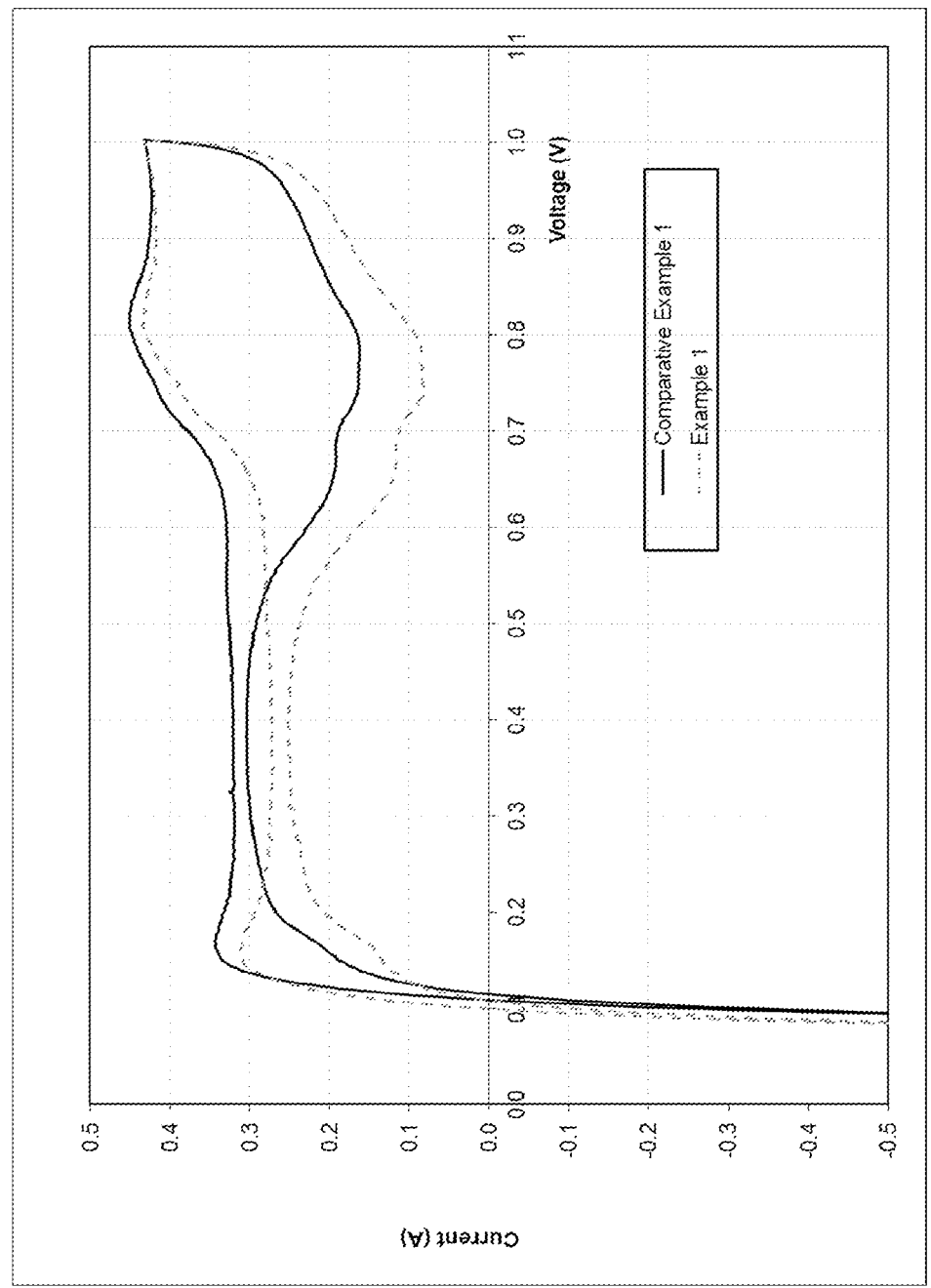
Figure 4: Cyclic Voltammetry Data Demonstrating Improved H₂ Cross-over

ION-CONDUCTING MEMBRANE

The present invention relates to a novel ion-conducting membrane, suitable for use in electrochemical devices, for example fuel cells.

A fuel cell is an electrochemical cell comprising two electrodes separated by an electrolyte. A fuel, such as hydrogen or a hydrocarbon such as methanol or ethanol, is supplied to the anode and an oxidant, such as oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

In the hydrogen or hydrocarbon-fuelled proton exchange membrane fuel cell (PEMFC) the electrolyte is a solid polymeric membrane which is electronically insulating and proton conducting. Protons produced at the anode, are transported across the membrane to the cathode, where they combine with oxygen to form water. The most widely used hydrocarbon fuel is methanol, and this variant of the PEMFC is often referred to as a direct methanol fuel cell (DMFC).

The principal component of a hydrogen-fuelled PEMFC or a DMFC is known as a membrane electrode assembly (MEA) and is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

The MEA can be constructed by several methods. The electrocatalyst layer may be applied to the gas diffusion layer to form a gas diffusion electrode. Two gas diffusion electrodes can be placed either side of an ion-conducting membrane and laminated together to form the five-layer MEA. Alternatively, the electrocatalyst layer may be applied to both faces of the ion-conducting membrane to form a catalyst coated ion-conducting membrane. Subsequently, gas diffusion layers are applied to both faces of the catalyst coated ion-conducting membrane. Finally, an MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically tens or hundreds of MEAs are required to provide enough power for most applications, so multiple MEAs are assembled to make up a fuel cell stack. Field flow plates are used to separate the MEAs. The plates perform several functions: supplying the reactants to the MEAs, removing products, providing electrical connections and providing physical support.

Conventional ion-conducting membranes used in PEM-FCs and DMFCs are generally formed from perfluorinated sulphonic acid (PFSA) ionomers and the membranes formed from these ionomers are sold under the trade names Nafion® (E.I. DuPont de Nemours and Co.), Aciplex® (Asahi Kasei) and Flemion® (Asahi Glass KK). Such PFSA based ion-conducting membranes are suitably formed from a polymer having a side chain linked to the backbone of the polymer via an ether linkage. The typical structure of PFSA ionomers is shown below.

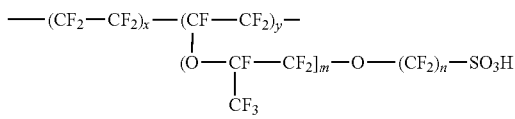

Typical Structure of PFSA Ionomer

The PFSA ion-conducting membrane may contain a reinforcement to provide improved mechanical properties such as increased tear resistance and reduced dimensional change on hydration and dehydration. The preferred reinforcement may be based on, but not exclusively, a microporous web or fibres of a fluoropolymer such as polytetrafluoroethylene (PTFE), as described in U.S. Pat. No. 6,254,978, EP 0814897 and U.S. Pat. No. 6,110,330, or polyvinylidene fluoride (PVDF), or alternative-materials-such as PEEK or polyethylene.

As PEMFCs employ very thin ionomeric membranes, in part to minimise its ionic resistance and thus maximise fuel cell performance, the permeation, to some extent, of the reactant gases $H_2$ and $O_2$ across the membranes (so-called gas crossover) is generally inevitable. Gas cross-over, and the subsequent catalysed chemical reaction of the crossed-over gas has a detrimental impact on membrane lifetime. It has been widely accepted than hydrogen peroxide ($H_2O_2$) and related radical species such as hydroperoxyl ($HO_2\bullet$) and hydroxyl ($HO\bullet$) are generated by the reaction of crossed-over gases on the catalysed or un-catalysed carbon surfaces of the PEMFC electrodes. These oxidising radical species attack the ionomeric component of the membrane, leading to chain scission, unzipping and loss of functional groups. $O_2$ or $H_2$ gas cross-over are the most fundamental governing mechanisms for membrane chemical degradation. This chemical degradation, which may or may not be combined with mechanical and thermal degradation, leads to membrane thinning and pinhole formation—which in turn, further accelerates gas cross-over. The impact of such degradation can range from a loss of conductivity and subsequent performance loss (in the case of modest chemical degradation) to individual cell and ultimately, stack, failure. Cross-over of reactant gas to the opposite electrode can further reduce cell performance by de-polarising that electrode by parasitic reactions. Finally, the cross-over of reactant gases leads to a direct loss of fuel cell electrical efficiency because although the reactant is consumed, the electrical work is not captured. To further improve the functionality of the PEMFC membrane and reduce material costs, thinner membranes have been the focus of recent fuel cell development. This reduction in membrane thickness may lead to a direct increase in gas cross-over; thus there is clearly a requirement to reduce the gas cross-over, and in particular hydrogen cross-over from the anode to the cathode, without compromising PEMFC performance.

In the DMFC there is a need to lower the cross-over of unreacted methanol from anode to cathode through the solid polymeric membrane of the MEA without lowering the electrical efficiency or power density of the fuel cell. This is required to raise the fuel efficiency and to prevent lowering of the MEA performance due to poisoning of the cathode by the methanol and the electro-oxidation products generated at the cathode from the methanol.

It is therefore an object of the invention to provide an improved ion-conducting membrane for both the hydrogen-fuelled PEMFC and the DMFC which shows a reduction in reactant cross-over, but with comparable performance to the state-of-the-art PFSA membranes.

Accordingly, the present invention provides an ion-conducting membrane comprising a first layer and a second layer, wherein the first layer comprises a perfluorosulphonic acid polymer and the second layer comprises a sulphonated hydrocarbon polymer, characterised in that the ion-conducting membrane has a total thickness of from 5 µm to 50 µm, and the second layer has a total thickness of 2 µm or less. Suitably the second layer has a total thickness of less than 2 µm.

In one embodiment of the present invention, the ion-conducting membrane further comprises a third layer comprising a sulphonated hydrocarbon polymer, wherein the first layer is sandwiched between the second and third layers. Suitably, the third layer has a total thickness of 2 µm or less. Suitably the third layer has a total thickness of less than 2 µm.

In a further aspect of the invention, the second and, if present, third layers comprise a mixture of sulphonated hydrocarbon polymer and perfluorosulphonic acid polymer. The mixture of the two polymers may be homogeneous throughout the second and third layers or non-homogeneous, such that there is enrichment of the perfluorosulphonic acid polymer at the interfaces of the layers and/or at the outer face of the membrane.

The perfluorosulphonic acid polymer has a structure as hereinbefore described and includes polymers sold under the tradenames Nafion® (E.I. DuPont de Nemours and Co.), Aciplex® (Asahi Kasei) and Flemion® (Asahi Glass KK).

The sulphonated hydrocarbon polymers include those based on polyarylenes, including polyether sulfones (e.g. polyarylene sulfone (PSU, Udel®), polyarylene ether sulfone (PES, Victrex®) and polyether ketones (e.g. polyarylene ether ether ketone (PEEK, Victrex®), polyarylene ether ether ketone ketone (PEEKK, Hostatec®), polyarylene ether ketone, ether ketone ketone (PEKEKK, Ultrapec®) and polyarylene ether ketone (PEK, Victrex®)). Suitably, the hydrocarbon polymer is a sulphonated sulphonated polyarylene ether sulphone or sulphonated polyarylene ether ketone.

If a third layer is present, the sulphonated hydrocarbon polymer in the second and the third layers may be the same or different; in a preferred embodiment, the sulphonated hydrocarbon polymer in the second and the third layers is the same.

The ion-conducting membrane has a thickness of less than or equal to 50 µm, suitably less than or equal to 30 µm, more suitably less than or equal to 25 µm, and more suitably less than or equal to 20 µm. Suitably, the ion-conducting membrane has a minimum thickness of 5 µm. The actual thickness will be dependent on its end use and appropriate thicknesses of the ion-conducting membrane would be readily known to the skilled person.

The thickness of each of the second and, if present, third layers is suitably less than the thickness of the first layer. The second and, if present, third layers each have an individual thickness of 2 µm or less, suitably less than 2 µm, more suitably less than 1 µm, preferably less than 0.5 µm.

The ion-conducting membrane of the invention may be prepared by applying a sulphonated hydrocarbon layer to one or both sides of a pre-existing perfluorosulphonic acid membrane, by methods which include, but are not limited to spraying, k-bar coating and doctor blading. Alternatively, the membrane may be prepared by sequentially casting the layers from an appropriate polymer dispersion or solution. In the case where the second, and if present third, layer comprises a mixture of sulphonated hydrocarbon polymer and perfluorosulphonic acid polymer, a solvent system compatible with both polymers is required; selection of such a solvent system is within the capability of the skilled person.

In a further aspect of the invention, and particularly for PEMFC applications, the ion-conducting membrane further comprises a hydrogen peroxide decomposition catalyst and/or a radical scavenger as described in further detail in WO2009/109780 incorporated herein by reference. The hydrogen peroxide decomposition catalyst may be embedded within the first, second and/or third layer, present at the interface of the first/second and/or first/third layers, or present as a coating on the outer face of the second and/or third layer.

In a further embodiment of the invention, the ion-conducting membrane further comprises at least one reinforcing material, for example a microporous web or fibres of a fluoropolymer such as PTFE as described in U.S. Pat. No. 6,254,978, EP 0814897 and U.S. Pat. No. 6,110,330, or polyvinylidene fluoride (PVDF), or alternative materials such as PEEK or polyethylene. Suitably, the reinforcing material is of PTFE. In one embodiment, the reinforcing material is positioned within the first layer. In a second embodiment, the reinforcing material extends across the interface of the first/second layer and/or the first/third layer into the second and/or third layer. In this second embodiment, the reinforcing material can either extend to one or both outer faces of the ion-conducting membrane or, alternatively, does not extend to one or both outer faces of the ion-conducting membrane structure such that at one or both outer faces of the ion-conducting membrane, the ion-conducting membrane is not reinforced. To make a reinforced ion-conducting membrane, the reinforcing material is partially embedded within the first layer before drying and forming the solid film. Once the first layer has dried, the second and, if present, third layers are cast onto one or both faces of the first layer such that the reinforcing material is also embedded within the second and/or third layers. In the case where the reinforcing material does not extend to one or both of the outer surfaces of the ion-conducting membrane, sufficient of the second and/or third layer is cast so that once dried, it extends beyond the reinforcing material as required.

The ion-conducting membrane of the invention may be used in any electrochemical device requiring an ion-conducting, specifically proton-conducting, membrane. Accordingly, a further aspect of the invention provides an electrochemical device comprising an ion-conducting membrane as hereinbefore described. Alternatively, there is provided the use of an ion-conducting membrane as hereinbefore described in an electrochemical device. In a preferred embodiment of the invention, the ion-conducting membranes are used in fuel cells, for example PEMFCs, including DMFCs, and preferably hydrogen-fuelled PEMFCs. Thus, the present invention further provides a catalyst-coated ion-conducting membrane comprising an ion-conducting membrane according to the invention and an electrocatalyst layer deposited on at least one side of the ion-conducting membrane. In one embodiment, the catalyst-coated ion-conducting membrane structure has an electrocatalyst layer deposited on both sides of the ion-conducting membrane. If the ion-conducting membrane of the invention has only a second layer present and no third layer, the second layer can either be adjacent to the anode electrocatalyst or the cathode electrocatalyst; and whether adjacent to the anode electrocatalyst or adjacent to the cathode electrocatalyst it may also assist in the water management of the cell, in addition to helping to reduce reactant cross-over.

The electrocatalyst layers comprise an electrocatalyst which may be a finely divided metal powder (metal black), or may be a supported catalyst wherein small metal particles are dispersed on electrically conducting particulate carbon supports. The electrocatalyst metal (the primary metal) is suitably selected from
(i) the platinum group metals (platinum, palladium, rhodium, ruthenium, iridium and osmium), or
(ii) gold or silver.

The primary metal may be alloyed or mixed with one or more other precious metals such as ruthenium, or base metals such as molybdenum, tungsten, cobalt, chromium, nickel, iron, copper or an oxide thereof. Preferably, the primary metal is platinum. If the electrocatalyst is a supported catalyst, the loading of primary metal particles on the carbon support material is suitably in the range 5-90 wt %, preferably 5-75 wt %.

The electrocatalyst layer(s) may suitably comprise other components, such as ion-conducting polymer, which is included to improve the ionic conductivity within the layer. The ion-conducting polymer is typically provided in a solution or dispersion form and is mixed together with the electrocatalyst to form an ink for subsequent formation of the electrocatalyst layer. The ion-conducting polymer may be a perfluorosulphonic acid polymer or a hydrocarbon polymer or a mixture thereof as herein described. In one embodiment, the electrocatalyst layer(s) may further comprise one or more hydrogen peroxide decomposition catalysts and/or one or more radical scavenger as hereinbefore described. Preparation routes for preparing electrocatalyst layers comprising these components will be known to the skilled person.

A still further aspect of the invention provides a MEA comprising an ion-conducting membrane or a catalyst-coated ion-conducting membrane as hereinbefore described. The MEA may be made up in a number of ways including, but not limited to:
(i) an ion-conducting membrane of the invention may be sandwiched between two gas diffusion electrodes (one anode and one cathode);
(ii) a catalyst-coated ion-conducting membrane of the invention coated on one side only by a catalyst layer and sandwiched between a gas diffusion layer and a gas diffusion electrode, the gas diffusion layer contacting the side of the ion-conducting membrane coated with the catalyst layer or;
(iii) a catalyst-coated ion-conducting membrane of the invention coated on both sides with a catalyst layer and sandwiched between two gas diffusion layers.

The anode and cathode gas diffusion layers are suitably based on conventional non-woven carbon fibre gas diffusion substrates such as rigid sheet carbon fibre papers (e.g. the TGP-H series of carbon fibre papers available from Toray Industries Inc., Japan) or roll-good carbon fibre papers (e.g. the H2315 based series available from Freudenberg FCCT KG, Germany; the Sigracet® series available from SGL Technologies GmbH, Germany; the AvCarb® series available from Ballard Material Products, United States of America; or the NOS series available from CeTech Co., Ltd. Taiwan), or on woven carbon fibre cloth substrates (e.g. the SCCG series of carbon cloths available from the SAATI Group, S.p.A., Italy; or the W0S series available from CeTech Co., Ltd, Taiwan). For many PEMFC applications the non-woven carbon fibre paper, or woven carbon fibre cloth substrates are typically modified with a hydrophobic polymer treatment and/or application of a microporous layer comprising particulate material either embedded within the substrate or coated onto the planar faces, or a combination of both to form the gas diffusion layer. The particulate material is typically a mixture of carbon black and a polymer such as polytetrafluoroethylene (PTFE). Suitably the gas diffusion layers are between 100 and 300 µm thick. Preferably there is a layer of particulate material such as carbon black and PTFE on the faces of the gas diffusion layers that contact the electrocatalyst layers.

The MEA may further comprise components that seal and/or reinforce the edge regions of the MEA for example as described in WO2005/020356. The MEA is assembled by conventional methods known to those skilled in the art.

A yet further aspect of the invention provides a fuel cell comprising an ion-conducting membrane, a catalyst-coated ion-conducting membrane or a MEA as hereinbefore described.

The ion-conducting membrane of the invention will now be described in more detail with reference to the figures.

FIG. 1 is a schematic of an ion-conducting membrane of the invention comprising a first PFSA layer and second sulphonated hydrocarbon layer.

FIG. 2 is a schematic of an ion-conducting membrane of the invention comprising a first PFSA layer, a second sulphonated hydrocarbon layer and a third sulphonated hydrocarbon layer.

FIGS. 1a, 1b and 1c each show an ion-conducting membrane (1) comprising a first ion-conducting PFSA layer (2) and a second ion-conducting sulphonated hydrocarbon layer (3). The ion-conducting membrane (1) shown in FIG. 1a is not reinforced. The ion-conducting membrane (1) shown in FIG. 1b has a reinforcing material (5) positioned across the interface of the first ion-conducting PFSA layer (2) and the second ion-conducting hydrocarbon layer (3). The reinforcing material (5) does not extend to the outer faces of the ion-conducting membrane (1). The ion-conducting membrane (1) shown in FIG. 1c also has a reinforcing material (5) positioned across the interface of the first ion-conducting PFSA layer (2) and the second ion-conducting sulphonated hydrocarbon layer (3). The reinforcing material (5) extends throughout the entire ion-conducting membrane. Also within the scope of the invention, is an ion-conducting membrane (1) similar to FIGS. 1b and 1c wherein the reinforcement does not extend to one of the outer faces, but does extend to the second outer face.

FIGS. 2a, 2b and 2c each show an ion-conducting membrane (1) comprising a first ion-conducting PFSA layer (2), a second ion-conducting sulphonated hydrocarbon layer (3) and a third ion-conducting sulphonated hydrocarbon layer (4). In FIG. 2a, the ion-conducting sulphonated hydrocarbon layers (3) and (4) entirely comprise of a sulphonated hydrocarbon ionomer. In FIG. 2b, the ion-conducting sulphonated hydrocarbon layers (3) and (4) each comprise a blend of PFSA and sulphonated hydrocarbon ionomers. The PFSA/sulphonated hydrocarbon composition is uniform through each of the layers (3) and (4). In FIG. 2c, the ion-conducting sulphonated hydrocarbon layers (3) and (4) comprise a blend of PFSA and sulphonated hydrocarbon ionomers which are graded such that there is enrichment of the PFSA component at (i) the interface with the first ion-conducting PFSA layer (2) and/or (ii) the outer faces of the ion-conducting membrane (1). Such grading of the ion-conducting sulphonated hydrocarbon may be at one or both of the faces of the ion-conducting layers (3) and/or (4).

FIG. 3 provides the results of a comparison between the single cell performance of an embodiment according to the present disclosure and the single cell performance of a conventional membrane designated Comparative Example 1.

FIG. 4 provides the results of a determination of cyclic voltammetry data of both an embodiment according to the present disclosure and a conventional membrane designated Comparative Example 1, which demonstrates the improvement provided by the presently disclosed membranes with respect to preventing $H_2$ crossover.

It will also be apparent to the skilled person that, an ion-conducting membrane wherein one of the second (3) and third (4) layers has a blend of PFSA/sulphonated hydrocarbon, either as a uniform composition throughout the layer (as described in relation to FIG. 2b) or having a gradient (as described in relation to FIG. 2c) and the other of the second (3) and third (4) layers is only of sulphonated hydrocarbon, or has a different blend composition/gradient to the other layer is within the scope of the present invention. Similarly, the second ion-conducting sulphonated hydrocarbon layer (3) in FIGS. 1a, 1b and 1c could comprise a blend of PFSA/hydrocarbon as described in relation to FIG. 2.

The structures of FIGS. 2a, 2b and 2c may be: (i) without a reinforcing material, as illustrated in FIG. 1a; (ii) with a reinforcement structure that is positioned across one or both of the interfaces between the first ion-conducting PFSA layer (2), second ion-conducting sulphonated hydrocarbon layer (3) and a third ion-conducting sulphonated hydrocarbon layer (4) in which the reinforcing material does not extend to the outer faces of the ion-conducting membrane, as per FIG. 1b; (iii) with a reinforcement structure that is positioned across one or both of the interfaces between the first ion-conducting PFSA layer (1), second ion-conducting sulphonated hydrocarbon layer (3) and a third ion-conducting sulphonated hydrocarbon layer (4) in which the reinforcing material fully extends to the outer faces of the ion-conducting membrane, per FIG. 1c; or (iv) with a reinforcement structure that extends to one of the outer faces, but does extend to the second outer face.

EXAMPLE 1

Preparation of the Ion-Conducting Membrane of the Invention

A sulphonated polyarylene ether ketone copolymer was ground using a planetary mill and dissolved in acetone/THF/water (6/3/1) and filtered to give a 1.24% solution. This solution was spray coated using an automated spray coater onto a 17 μm reinforced PFSA membrane held in place on a vacuum bed at ca. 45° C. The resulting membrane showed a slightly translucent hydrocarbon polymer layer formed on one face. SEM showed the thickness of the hydrocarbon layer to be 2 μm and the reinforcing material present only within the PFSA (first) layer.

Preparation of MEA

A CCM was prepared by laminating (at 170° C./800 psi) the membrane prepared above between an anode (<0.1 mg/cm$^2$Pt; 60% Pt/Ketjen EC300J carbon black/150% aqueous Nafion) and a cathode (0.4 mg/cm$^2$Pt; 60% Pt/Ketjen EC300J carbon black/120% aqueous Nafion). The CCM was combined with a carbon-coated teflonated Toray TGP-G-H060 (from Toray Industries) on the anode side and a gas diffusion layer from the Sigracet® series from SGL Technologies GmbH on the cathode side to provide give a complete five-layer MEA.

COMPARATIVE EXAMPLE 1

A CCM was prepared in a similar manner to that described for Example 1, except the membrane was a 17 μm reinforced PFSA membrane without the hydrocarbon coating on one surface thereof. The CCM was combined with a carbon-coated teflonated Toray TGP-G-H060 (from Toray Industries) on the anode side and a substrate from the Sigracet® series from SGL Technologies GmbH on the cathode side to provide a complete five-layer MEA.

Single Cell Performance (Polarisation Testing)

The MEAs prepared in Example 1 and Comparative Example 1 were tested in a 49 cm$^2$ active area, graphite plate single fuel cell with serpentine channel flow field plates. Using a bladder system, the cell was compressed to 60 psi.

The MEAs were conditioned at 500 mA/cm$^2$ overnight, 80° C., 100% RH anode/100% RH cathode, $H_2$/air, 100 kPa anode/100 kPa cathode, 2/2 stoichiometry, after which a stable voltage of 0.75V was attained MEA polarization curves were run at 80° C., 100% RH anode/50% RH cathode, H2/oxygen/air, 50 kPa anode/50 kPa cathode.

The results are shown in FIG. 3, which shows that the Example 1 of the invention has a comparable performance to Comparative Example 1 despite having a hydrocarbon polymer layer on one side of the PFSA membrane.

Determination of Reduction in $H_2$ Cross-Over

Upon completion of the polarisation testing, the MEAs of Example 1 and Comparative Example 1 were returned to the initial conditions i.e. 80° C., 100% RH anode/100% RH cathode, H2/air, 100 kPa anode/100 kPa cathode, 2/2 stoichiometry for approximately 1 hour. The cathode gas was then switch from air to $N_2$ (1.5 L/min) and a small load (100 mA/cm$^2$) drawn for 10 minutes to consume any residual air on the cathode electrode. Cyclic voltammetry data from the cathode electrode was then collected; (0.05–1.0 V, 15 mV/s) using a potentiostat to control cell. The results are shown in FIG. 4. The current obtained at a voltage of between 0.35 and 0.45V is due to $H_2$ crossover; the lower the current the lower is the crossover. It can be seen that the Example 1 of the invention has a lower average current from both the forward and reverse voltage sweeps in this region and therefore has reduced $H_2$ crossover compared to Comparative Example 1.

The invention claimed is:
1. An ion-conducting membrane comprising a first layer and a second layer, wherein
the first layer consists of a perfluorosulphonic acid polymer as an ion-conducting polymer and optionally a reinforcing material,
the second layer comprises a sulphonated hydrocarbon polymer as an ion-conducting polymer and includes a catalyst that consists of a hydrogen peroxide decomposition catalyst, a radical scavenger, or both a hydrogen peroxide decomposition catalyst and a radical scavenger, or no catalyst,
the first layer and the second layer comprise different ion-conducting polymer compositions,
the ion-conducting membrane has a total thickness of from 5 μm to 50 μm, and the second layer has a total thickness of 0.5 μm or less.

2. The ion-conducting membrane according to claim 1, which further comprises a third layer comprising a sulphonated hydrocarbon polymer, wherein the first layer is sandwiched between the second and third layers.

3. The ion-conducting membrane according to claim 2, wherein the third layer has a total thickness of 2 μm or less.

4. The ion-conducting membrane according to claim 1, wherein the second layer comprises a mixture of sulphonated hydrocarbon polymer and perfluorosulphonic acid polymer.

5. The ion-conducting membrane according to claim 2, wherein the third layer comprises a mixture of sulphonated hydrocarbon polymer and perfluorosulphonic acid polymer.

6. A catalyst-coated membrane comprising an ion-conducting membrane according to claim 1 and an electrocatalyst layer deposited on at least one side of the membrane.

7. A membrane electrode assembly comprising an ion-conducting membrane according to claim 1.

8. A membrane electrode assembly comprising a catalyst-coated membrane according to claim 6.

9. The ion-conducting membrane according to claim 3, wherein the third layer has a thickness of less than 1 μm.

10. The ion-conducting membrane according to claim 1, wherein the ion-conducting membrane is without a reinforcement material.

11. The ion-conducting membrane according to claim 1, further comprising at least one reinforcement material.

12. The ion-conducting membrane according to claim 11, wherein the at least one reinforcement material extends across an interface between the first layer and the second layer.

13. The ion-conducting membrane according to claim 11, wherein the at least one reinforcement material extends across an interface between the first layer and the second layer and across an interface between the first layer and the third layer.

14. An ion-conducting membrane comprising:
 a first layer consisting of a perfluorosulphonic acid polymer as an ion-conducting polymer and optionally a reinforcing material;
 a second layer comprising a blend of a sulphonated hydrocarbon polymer and a perfluorosulphonic acid polymer as an ion-conducting polymer, the second layer having a thickness of 0.5 μm or less and including a catalyst that consists of a hydrogen peroxide decomposition catalyst, a radical scavenger, or both a hydrogen peroxide decomposition catalyst and a radical scavenger, or no catalyst;
 a third layer comprising a blend of a sulphonated hydrocarbon polymer and a perfluorosulphonic acid polymer as an ion-conducting polymer, the third layer having a thickness of 2 μm or less and including a catalyst that consists of a hydrogen peroxide decomposition catalyst, a radical scavenger, or both a hydrogen peroxide decomposition catalyst and a radical scavenger, or no catalyst;
 wherein the first layer is sandwiched between the second and third layers, and
 wherein the first layer and the second layer comprise different ion-conducting polymer compositions, the first layer and third layer comprises different ion-conduction polymer compositions, and the ion-conducting membrane has a total thickness of from 5 μm to 50 μm.

15. The ion-conducting membrane according to claim 14, wherein the blend of sulphonated hydrocarbon polymer and perfluorosulphonic acid polymer of the second layer is graded across the second layer such that there is enrichment of the perfluorosulphonic acid polymer at an interface of the first layer and second layer and/or there is enrichment of the perfluorosulphonic acid polymer at an outer surface of the ion-conducting membrane.

16. The ion-conducting membrane according to claim 15, wherein the blend of sulphonated hydrocarbon polymer and perfluorosulphonic acid polymer of the third layer is graded across the third layer such that there is enrichment of the perfluorosulphonic acid polymer at an interface of the first layer and second layer and/or there is enrichment of the perfluorosulphonic acid polymer at an outer surface of the ion-conducting membrane.

17. The ion-conducting membrane according to claim 14, wherein the blend of sulphonated hydrocarbon polymer and perfluorosulphonic acid polymer of the third layer is graded across the third layer such that there is enrichment of the perfluorosulphonic acid polymer at an interface of the first layer and third layer and/or there is enrichment of the perfluorosulphonic acid polymer at an outer surface of the ion-conducting membrane.

18. A catalyst-coated membrane comprising an ion-conducting membrane according to claim 16 and an electrocatalyst layer deposited on at least one side of the membrane.

19. A membrane electrode assembly comprising an ion-conducting membrane according to claim 17.

20. A membrane electrode assembly comprising a catalyst-coated membrane according to claim 17.

* * * * *